(12) United States Patent
Yeşil

(10) Patent No.: US 11,731,375 B2
(45) Date of Patent: Aug. 22, 2023

(54) STRUCTURE ELEMENTS MADE OF COMPOSITE MATERIAL

(71) Applicant: RENCO WORLD CORPORATION, Miami, FL (US)

(72) Inventor: Kamil Engin Yeşil, Istanbul (TR)

(73) Assignee: Renco World Corporation, Miami, FL (US)

( * ) Notice: Subject to any disclaimer, the term of this patent is extended or adjusted under 35 U.S.C. 154(b) by 284 days.

(21) Appl. No.: 17/135,083

(22) Filed: Dec. 28, 2020

(65) Prior Publication Data

US 2021/0206120 A1 Jul. 8, 2021

(30) Foreign Application Priority Data

Jan. 8, 2020 (TR) .................................. 2020/00224

(51) Int. Cl.

| | | |
|---|---|---|
| *B29C 70/02* | (2006.01) | |
| *B29C 65/56* | (2006.01) | |
| *C08K 7/06* | (2006.01) | |
| *C08K 7/14* | (2006.01) | |
| *B29K 67/00* | (2006.01) | |
| *B29K 105/16* | (2006.01) | |
| *B29K 105/12* | (2006.01) | |

(52) U.S. Cl.
CPC .......... *B29C 70/025* (2013.01); *B29C 65/562* (2013.01); *C08K 7/06* (2013.01); *C08K 7/14* (2013.01); *B29K 2067/00* (2013.01); *B29K 2105/12* (2013.01); *B29K 2105/16* (2013.01); *B29K 2995/0063* (2013.01)

(58) Field of Classification Search
CPC ............... B29C 70/025; B29C 65/562; B29K 2105/16; C08K 7/14; C08K 7/06
USPC ........................................................... 428/480
See application file for complete search history.

(56) References Cited

U.S. PATENT DOCUMENTS 10,876,291 B2 * 12/2020 Yesil .......................... E04C 1/00
2003/0170445 A1 9/2003 Parrish

FOREIGN PATENT DOCUMENTS

CN 107141685 A * 9/2017 ............. C08K 13/06

OTHER PUBLICATIONS

Translation of CN107141685, Sep. 8, 2017. (Year: 2017).*

* cited by examiner

*Primary Examiner* — Hui H Chin
(74) *Attorney, Agent, or Firm* — Lerner David LLP

(57) ABSTRACT

The present invention is a structure element comprising a body made of composite material and at least one connection member which is one-piece with said body and which is for providing connection to another structure element with the same characteristic. Accordingly, the composite material is BMC material using bulk material, and the bulk material comprises at least one type of fiber between 15% and 25% for providing resistance, at least one type of mineral powder between 40% and 50% as filling material, and at least one type of resin between 20% and 30% as the binding item which binds fiber to filling material.

6 Claims, No Drawings

STRUCTURE ELEMENTS MADE OF COMPOSITE MATERIAL

CROSS-REFERENCE TO RELATED APPLICATION

This application claims the benefit of Turkish Patent Application Serial No. 2020/00224, filed 8 Jan. 2020, and which application is incorporated herein by reference. To the extent appropriate, a claim of priority is made to the above-disclosed application.

Technical Field

The present invention relates to a structure element comprising a body made of composite material and at least one connection member which is one-piece with said body and which is for providing connection to another structure element with the same characteristic.

Known State of the Art

In construction sector, structures are frequently made of concrete, brick and steel-based materials. Structures have carrier walls which carry the load and intermediate walls which form compartments in the building. For the carrier walls, mostly concrete material or materials which can carry load are preferred, and the intermediate walls of structures are essentially formed by ytong, bracket, brick and plasterboards with aluminum frame carcass. Since most of the mentioned intermediate wall materials are very heavy, they lead to excessive load for the building. Since these materials are heavy, the transportation costs increase. Moreover, additional material usage like adhesive, mortar and additional labor like plastering are needed while forming the intermediate walls. For the usage of plasterboard, additional labor requirements occur like carrying, cutting and joining of profiles for forming the frame carcass, and the usage of a frame carcass is needed.

Moreover, isolation inside the buildings is an important issue and it is a factor which substantially affects preferring of the building. The intermediate walls produced from the abovementioned materials cannot meet the requested values in thermal isolation and sound isolation. Besides, since the humidity transmittances of said materials are high, the intermediate walls are also affected by humidity.

As a result, because of the abovementioned problems, an improvement is required in the related technical field.

Structure elements made of composite materials bring a solution to these problems in a limited manner. For instance, in the patent with number US2003170445, composite material comprising resin and light artificial aggregate with silicon is disclosed. However, it does not bring a solution for providing homogenous, smooth and burr-free form to the structure elements and for providing low cost thereto.

BRIEF DESCRIPTION OF THE INVENTION

The present invention relates to a composite structure element, for eliminating the abovementioned disadvantages and for bringing new advantages to the related technical field.

An object of the present invention is to provide composite structure elements with increased homogeneity, smoothness and having burr-free form.

An object of the present invention is to provide composite structure elements with reduced production duration and with reduced labor in production.

An object of the present invention is to provide composite structure elements with high resistance.

In order to realize the abovementioned objects and the objects which are to be deducted from the detailed description below, the present invention is a structure element comprising a body made of composite material and at least one connection member which is one-piece with said body and which is for providing connection to another structure element with the same characteristic. Accordingly, the composite material is BMC material using bulk material and the bulk material comprises at least one type of fiber between 15% and 25% for providing resistance, at least one type of mineral powder between 40% and 50% as filling material, and at least one type of resin between 20% and 30% as the binding item which binds fiber to filling material.

In a possible embodiment of the present invention, the fiber length is between 3 mm and 12 mm.

In a possible embodiment of the present invention, the fiber is in chopped fiber form.

In a possible embodiment of the present invention, the density of bulk material is between 1.85 grams/cm$^3$ and 1.95 grams/cm$^3$.

In a possible embodiment of the present invention, in order to obtain a material having mechanical characteristics of steels of ST 50 and above, vinyl ester resin is provided as resin and carbon fiber is provided as fiber.

In a possible embodiment of the present invention, in order to obtain a material having mechanical characteristics of steels between ST 33 and ST 42, orthophythalic resin is provided as resin and glass fiber is provided as fiber.

In a possible embodiment of the present invention, in order to obtain a material having mechanical characteristics of steels between ST 42 and ST 50, isophythalic resin is provided as resin and aramid fiber is provided as fiber.

In a possible embodiment of the present invention, as the filling material, it comprises at least one type of mineral powder selected from a mineral group comprising silicium dioxide, barite, talc, aluminum trihydroxide and calcite.

In a possible embodiment of the present invention, structure element is produced by means of BMC injection method.

DETAILED DESCRIPTION OF THE INVENTION

In this detailed description, the subject matter composite material and the structure elements made of this composite material are explained with references to examples without forming any restrictive effect only in order to make the subject more understandable.

The subject matter structure elements essentially comprise a body made of composite material and at least one connection member which is one-piece with said body and which is for providing connection to another structure element with the same characteristic. The structures can be produced in toy-block rationale by means of said composite structure elements having one-piece connection members without using any connection element like screw and similar item or by using only very small number of connection elements in some necessary regions.

The form of the bodies of the structure elements can be different provided that the desired resistance and formal compliancy are provided. For instance, forms like box-like forms, completely full bodies, full bodies having narrow horizontal or vertical channels or bodies formed by at least two panels, steel reinforced bodies, porous, chambered or cage-structured bodies can be preferred.

The structure elements are made of a material based on a material named as BMC (bulk molding composites). The structure elements are produced by means of BMC injection production method. In BMC injection method, bulk material is used. The bulk material is added to the BMC injection machine, and structure elements are produced in the requested forms in a serial manner. In BMC injection method, there is varying pressure and temperature.

Accordingly, in a preferred paste formulation, said composite material comprises fiber between 15% and 25% by weight for providing resistance, at least one type of mineral powder between 40% and 50% by weight as filling material, and resin between 20% and 30% by weight as the binding item which binds fiber to filling material.

In BMC injection, although the amount of fiber usage is low, the resistance is high. When the fiber proportion in the thermoset material is low, although resistance decreases, the resistance of the structure element does not decrease since the fiber is distributed in a homogenous manner in the whole product by means of BMC injection and at the same time, since the paste, prepared for BMC injection, moves in the mold in a regular manner by means of varying pressure. At the same time, because of these reasons, the surface of the structure element is smoother.

The density of the paste prepared for BMC injection is between 1.85 grams/cm$^3$ and 1.95 grams/cm$^3$. The length of the fiber used is between 3 mm and 12 mm and chopped fiber is used. Thanks to these characteristics of the fiber, the composite material is prevented from being captured in the grooves which exist in columns of BMC injection machine. The lengths of the fiber provide the fiber to easily move inside the column. Moreover, the fiber scraps, having said lengths, mixes with the other materials in a better manner, and the homogeneity of the formed composite material is increased. Moreover, since the density of the paste is low, the capturing of the paste in the grooves is prevented.

In parts like corner columns, particularly in order to obtain a material with values of ST 52 steel and having relatively higher resistance, vinyl ester resin is preferred to be used as resin and carbon fiber is preferred to be used as fiber. In parts like roof grooves and roof coatings which do not need high resistance, in order to obtain a material which has relatively lower resistance and particularly at values of ST 37 steel, isophythalic resin is preferred as resin and glass fiber is preferred as fiber. In the structure elements like wall bricks where middle level of resistance is needed, isophythalic resin is preferred as resin and aramid fiber is preferred as fiber, and thus, a material with ST 42 steel values can be obtained.

On the other hand, as the filling material, at least one type of mineral powder is used which is selected from a mineral group comprising silicium dioxide, barite, talc, aluminum trihydroxide and calcite. As the chemical additive, at least one of the chemicals which increase water absorption, resistance of flame and resistance to abrasion is used. Additionally, said formulation can also comprise thermoplastic material with predetermined proportion for improving surface appearance.

Some test data of the subject matter structure element, obtained by an exemplary formulation, is as follows:

| Tests | Test Method | Values |
|---|---|---|
| Determination of Bending Resistance (N/mm$^2$) | TS 985 EN ISO 178 | ≥160 |
| Determination of Tensile Strength (MPa) | EN ISO 527-4 | ≥222 |
| Impact Resistance (kj/m$^2$) | EN ISO 179 | ≥110 |
| Barcole Hardness | EN59 | 70 |
| Water absorption (%) | TS 702, ISO 62 | Maximum 0.6% in 24 hours |
| Density (grams/cm$^3$) | TS 1818, ASTM D792 | 1.85-1.95 |
| Chemical Resistance (In 60% toluene, 40% n-heptane or diesel by volume, under the conditions of 168 ± hour at 23 ± 2° C.) (TS 1478 EN 124 Annex E) | EN ISO 14125 | Weight change, max 0.5% Bending resistance change −20% Bending module change −30% |
| Surface Resistance (Ω) | DIN IEC 93 | 5 × 10$^9$ |
| Volume Resistance (Ω) | DIN IEC 93 | 5 × 10$^{10}$ |
| Specific Transition Resistance (Ω · cm) | DIN IEC 93 | 1 × 10$^{12}$ |
| Ball Pressure Test | | Track Diameter, maximum 2 mm |
| Glow Wire Test | | There is no dripping |
| Accelerated Heat Dampening Test | | There is no puncture and deformation |
| Isolation Test | | There is no discharge and deformation |
| Test of Resistance Against Temperature Changes | | There is no deformation and crack |
| Test of Resistance Against Ultraviolet Rays | | There is no deformation and crack |

Moreover, as a result of the related tests made, it has been observed that the subject matter structure elements do not lead to dripping in the glow wire test, puncture and deformation do not occur in the accelerated heat dampening test, and no discharge and deformation occur in the isolation test. Additionally, in the resistance tests against temperature changes and in the resistance tests against ultraviolet rays, it has been observed that no deformation and cracks occur in the subject matter structure elements.

By means of the composite material whose characteristics are given above, pluralities of different structure elements can be produced besides the abovementioned exemplary structure elements.

By means of the BMC injection method, the composite structure elements can be produced in at least 50% times more rapid manner when compared with the other composite material production methods since the production cycle duration of BMC injection is shorter. Although the used fibers are in chopped form, the resistance of the structure elements is high since there is homogenous distribution. Since the paste, prepared for BMC injection and of which the characteristics and formula are given above, is bulk material and since it has low density, it can also be used in BMC hot press and SMC hot press methods. Such a formulation can also provide variety in the production method which is to be used.

In BMC injection method, since there is varying pressure and temperature, production of homogenous structure elements is facilitated. Moreover, in BMC injection method, since structure elements are produced by adding big amounts of bulk material to the BMC injection machine, a mass production is realized and a production which is clean and which has reduced labor force is provided. In the structure elements produced by the BMC injection method, burr formation is prevented. Therefore, the wastages in the product and the consumed labor are also reduced.

As a result, the protection scope of the present invention is set forth in the annexed claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:

1. A structure element comprising a body comprising a composite material and a connection member configured to provide a connection to another structure element with the same characteristic, wherein:
   the composite material is a bulk molding composite (BMC) material comprising:
   a chopped fiber at an amount of between 15% and 25% by weight for providing resistance;
   said fiber has length between 3 mm and 12 mm,
   a mineral powder between 40% and 50% by weight as filling material, and
   a resin between 20% and 30% by weight as the binding item which binds fiber to filling material.

2. The structure element according to claim 1, wherein in order to obtain a material having mechanical characteristics of steels of ST 50 and above, vinyl ester resin is provided as resin and carbon fiber is provided as fiber.

3. The structure element according to claim 1, wherein in order to obtain a material having mechanical characteristics of steels between ST 33 and ST 42, orthophythalic resin is provided as resin and glass fiber is provided as fiber.

4. The structure element according to claim 1, wherein in order to obtain a material having mechanical characteristics of steels between ST 42 and ST 50, isophythalic resin is provided as resin and aramid fiber is provided as fiber.

5. The structure element according to claim 1, wherein the mineral powder comprises silicium dioxide, barite, talc, aluminum trihydroxide calcite, or any combination thereof.

6. The structure element according to claim 1, produced by means of BMC injection method.

* * * * *